(12) United States Patent
Hsieh (10) Patent No.: US 11,793,360 B1
(45) Date of Patent: Oct. 24, 2023

(54) ANTI-SLIP AND SAFE CHOPPING BOARD STRUCTURE HAVING COMPOSITE SANDWICH

(71) Applicant: Tsao Ru Co., Ltd., Tainan (TW)

(72) Inventor: Jung-Hsien Hsieh, Tainan (TW)

(73) Assignee: Tsao Ru Co., Ltd., Tainan (TW)

( * ) Notice: Subject to any disclaimer, the term of this patent is extended or adjusted under 35 U.S.C. 154(b) by 0 days.

(21) Appl. No.: 17/826,310

(22) Filed: May 27, 2022

(51) Int. Cl.
 *A47J 47/00* (2006.01)
(52) U.S. Cl.
 CPC .................................. *A47J 47/005* (2013.01)
(58) Field of Classification Search
 CPC .................................................... A47J 47/005
 See application file for complete search history.

(56) References Cited

U.S. PATENT DOCUMENTS

| | | | |
|---|---|---|---|
| 2018/0084952 A1* | 3/2018 | Eckholm | A47J 47/005 |
| 2020/0268212 A1* | 8/2020 | Lin | B32B 23/04 |
| 2021/0251431 A1* | 8/2021 | Wirth | A47J 47/005 |
| 2021/0393085 A1* | 12/2021 | Sulik | A47J 47/005 |

* cited by examiner

*Primary Examiner* — Nirvana Deonauth (57) ABSTRACT

An anti-slip and safe chopping board structure contains: at least one top board, at least one bottom board, at least one reinforcement layer, and at least one anti-slip fringe. A respective one reinforcement layer is defined between a respective one top board and a respective one bottom board. The respective one anti-slip fringe is injection molded around peripheral sides of the respective one top board, the respective one bottom board, and the respective one reinforcement layer. The anti-slip fringe includes an extension extending along the peripheral sides of the respective one top board and the respective one bottom board and the respective one reinforcement layer. The respective one anti-slip fringe includes a covering portion, and a highness of the extension of the respective one anti-slip fringe is higher than a highness of the respective one top board and the respective one bottom board.

6 Claims, 12 Drawing Sheets

PRIOR ART
FIG.1

A-A SECTION VIEW

B-B SECTION VIEW
FIG.7

C-C SECTION VIEW
FIG.8

ANTI-SLIP AND SAFE CHOPPING BOARD STRUCTURE HAVING COMPOSITE SANDWICH

FIELD OF THE INVENTION

The present invention related to an anti-slip and safe chopping board structure having a composite sandwich which contains a top board, a bottom board, and a reinforcement layer, wherein the reinforcement layer is made of recycled plastic material or/and the biodegradable material so as to maintain a predetermined thickness of the anti-slip and safe chopping board structure, to enhance stability when chopping ingredients, and to reduce a consumption of the plastic material.

BACKGROUND OF THE INVENTION

Figure 1:
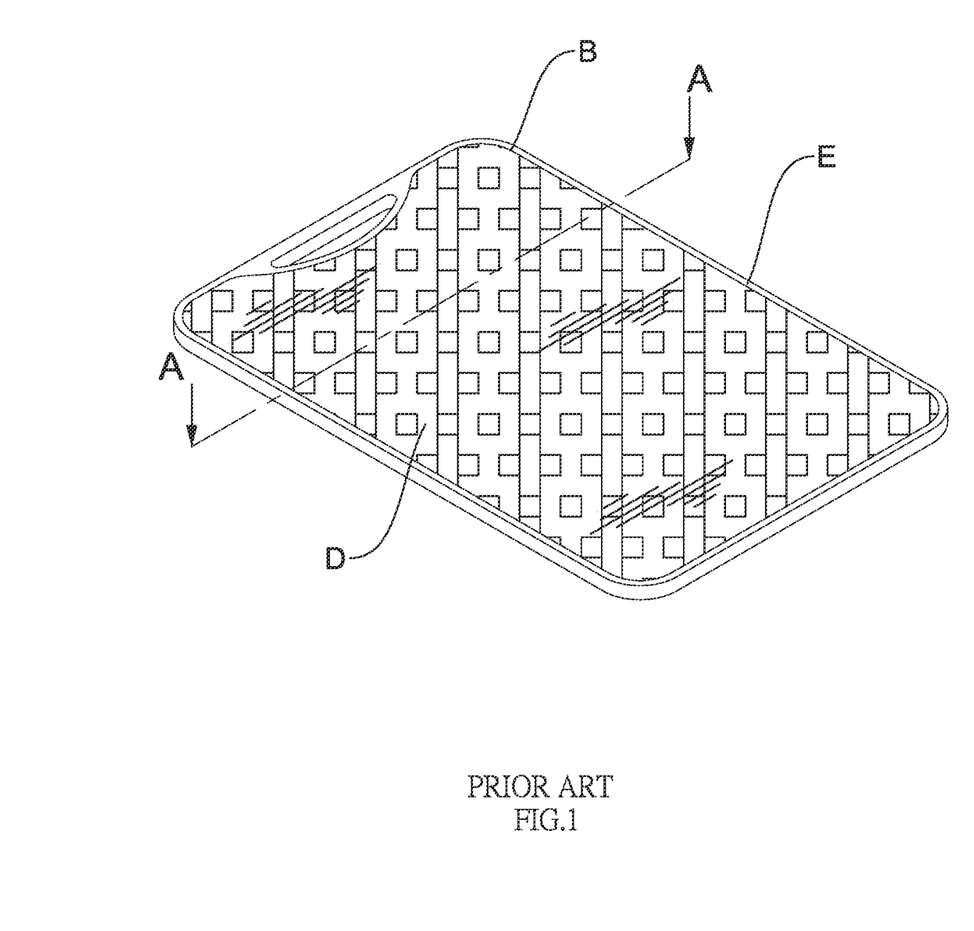
FIG. 1 is a perspective view of a conventional chopping board.
Figure 2:
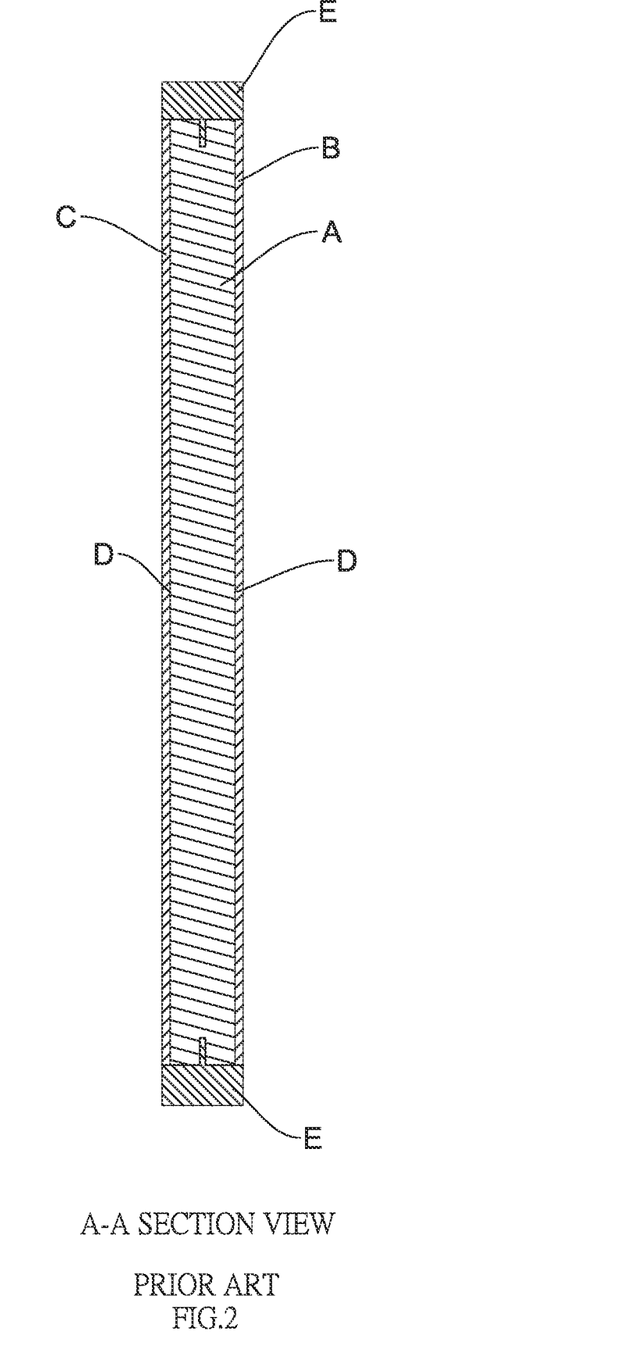
FIG. 2 is a cross sectional view taken along the line A-A of FIG. 1.

With reference to FIGS. 1 and 2, a conventional chopping board contains a substrate A made of plastic material, and the board assembly A includes a top board B and a bottom board C which are formed on a top and a bottom of the substrate A, wherein a pattern paper D is defined on the substrate A and the top board B, and the other pattern paper D is defined between the substrate A and the bottom board C. The substrate A, the top board B, the bottom board C, the pattern paper D, and the other pattern paper D are placed into a mold and are injection molded, thus connecting the substrate A, the top board B, the bottom board C, the pattern paper D, and the other pattern paper D.

However, the conventional chopping board has defects as follows:

1) According to foreign regulations (especially the European Union), it is required that the plastic content of plastic products should be gradually reduced every year, in other words, the use of plastic must be reduced; however, the recycled plastic cannot be used directly because of food safety issues, causing manufacturers to adjust the thickness of the cutting board to make it thinner and thinner, but if the cutting board is too thin, it will cause problems such as poor stability during use.

2) The substrate A, the top board B, and the bottom board C are adhered by way of a plastic adhesive strip E, wherein a highness of the plastic adhesive strip E is equal to a thickness of the top board B and the bottom board C, so water will on a kitchen counter or a ground/floor causing a slippery and dirty environment.

3) The top board B and the bottom board C are not raised, thus it is troublesome and labor-consuming to remove the top board C and the bottom board C from the kitchen counter.

4) The top board B and the bottom board C adhere on the kitchen counter easily, and a thickness of the chopping board is too thin to fix the chopping board stably. Therefore, multiple buffer pads (not shown) are arranged on the chopping board by using an adhesive, the multiple buffer pads are easily removed from the chopping board after a period of time causing usage danger.

5) The top board B, the bottom board C, and the plastic adhesive strip E are connected by using the adhesive, so water flows into a connection gap among the top board B, the bottom board C, and the plastic adhesive strip E to get the pattern paper D wet, and ink of the pattern paper D contacts with the ingredients causing unsafe eating.

The present invention has arisen to mitigate and/or obviate the afore-described disadvantages.

SUMMARY OF THE INVENTION

The primary aspect of the present invention is to provide an anti-slip and safe chopping board structure which contains: at least one top board, at least one bottom board, at least one reinforcement layer, and at least one anti-slip fringe, a respective one anti-fringe surrounding a respective one top board, a respective one bottom board, and a respective one reinforcement layer.

The respective one reinforcement layer is defined between the respective one top board and the respective one bottom board, and the respective one top board, the respective one bottom board, and the respective one reinforcement layer are placed in a mold. The respective one anti-slip fringe is injection molded around peripheral sides of the respective one top board, the respective one bottom board, and the respective one reinforcement layer. The anti-slip fringe includes an extension along the peripheral sides of the respective one top board and the respective one bottom board and the respective one reinforcement layer, and the respective one anti-slip fringe includes a covering portion extending and covering the respective one top board, the respective one bottom board, and the respective one reinforcement layer from the extension. A highness of the extension of the respective one anti-slip fringe is higher than a highness of the respective one top board and the respective one bottom board, such that a top and a bottom of the anti-slip and safe chopping board structure are covered by the respective one anti-slip fringe to form in an inward concavity shape.

Thereby, the anti-slip and safe chopping board structure of the present invention has advantages as follows:

1) The respective one reinforcement layer is made of the recycled plastic material or/and the biodegradable material, and the covering portion covers the respective one top board, the respective one bottom board and the respective one reinforcement layer from the extension to avoid a connection gap among the respective one top board, the respective one bottom board, the respective one reinforcement layer, and the respective one anti-slip fringe to obtain a predetermined thickness of the anti-slip and safe chopping board structure, thus chopping the ingredients smoothly and safely and reducing the consumption of the plastic material to obtain environmental friendly.

2) A peripheral side of the anti-slip and safe chopping board structure which is not used, is raised highly to avoid contamination and water leakage.

3) Since the peripheral side of the anti-slip and safe chopping board structure which is not used, is raised highly, the peripheral sides of the anti-slip and safe chopping board structure does not contact with a desktop or a kitchen counter to obtain anti-slip effect and avoid installation of multiple buffer pads.

4) The covering portion of the respective one anti-slip fringe covers the respective one top board, the respective one bottom board and the respective one reinforcement layer so that water does not flow into the connection gap among the respective one top board, the respective one bottom board and the respective one reinforcement layer to avoid releasing inks of the respective one pattern layer, thus enhancing an edible safety of the ingredients.

DETAILED DESCRIPTION OF THE PREFERRED EMBODIMENTS

Figure 3:
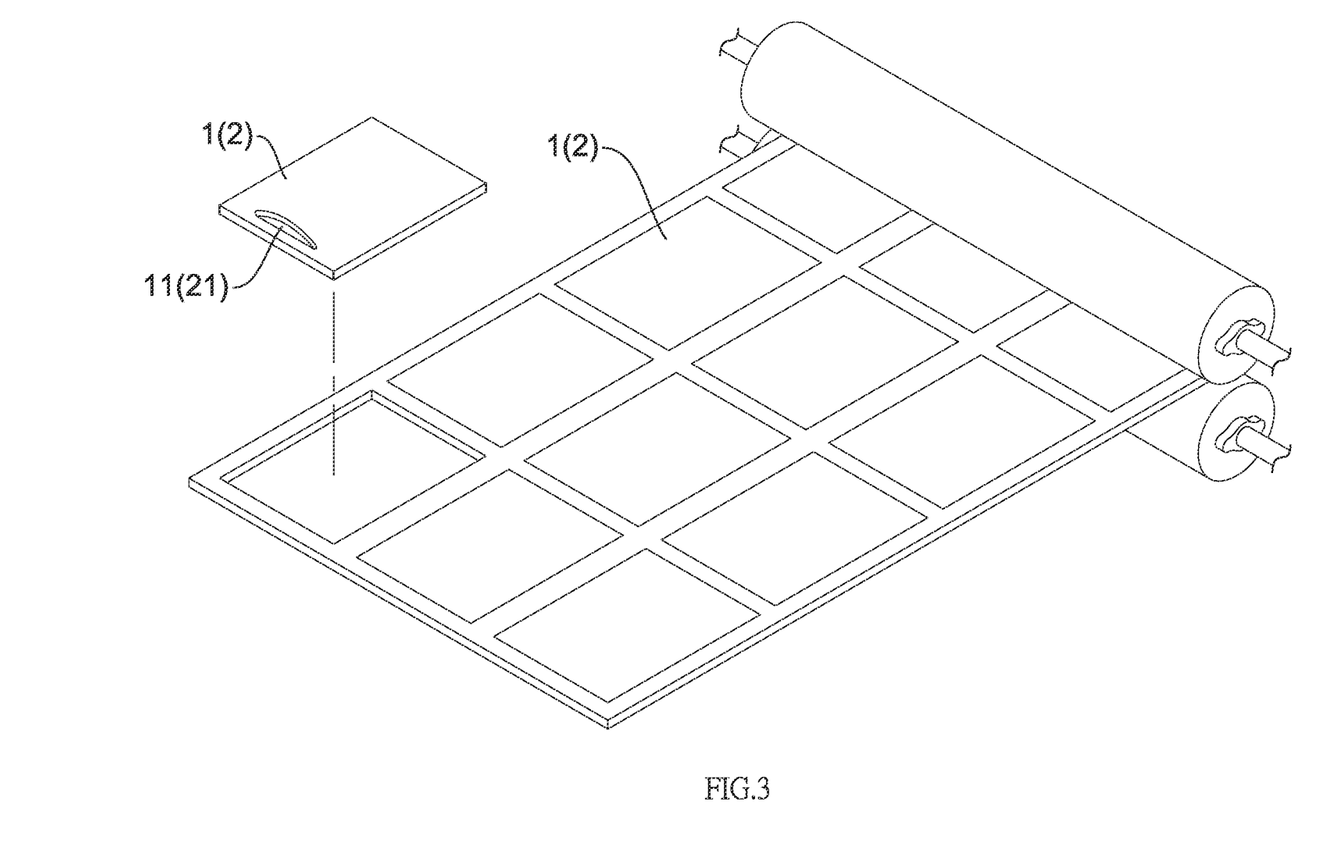
FIG. 3 is a perspective view showing at least one top board/at least one bottom board of an anti-slip and safe chopping board structure having a composite sandwich being manufactured according to a preferred embodiment of the present invention.

FIG. 3 is a perspective view showing at least one top board/at least one bottom board of anti-slip and safe chopping board structure having a composite sandwich being manufactured according to a preferred embodiment of the present invention, wherein the at least one top board 1 is made of impact-resistant tough plastic material by using a machine, and the at least one top board 1 is cut in a predetermined size by a stamping machine after being made in a mass production, wherein the impact-resistant tough plastic material of the at least one top board 1 is made of transparent material or translucent material. Referring to FIGS. 5-9, a respective one top board 1 has a first gripping orifice 11 defined thereon.

Figure 4:
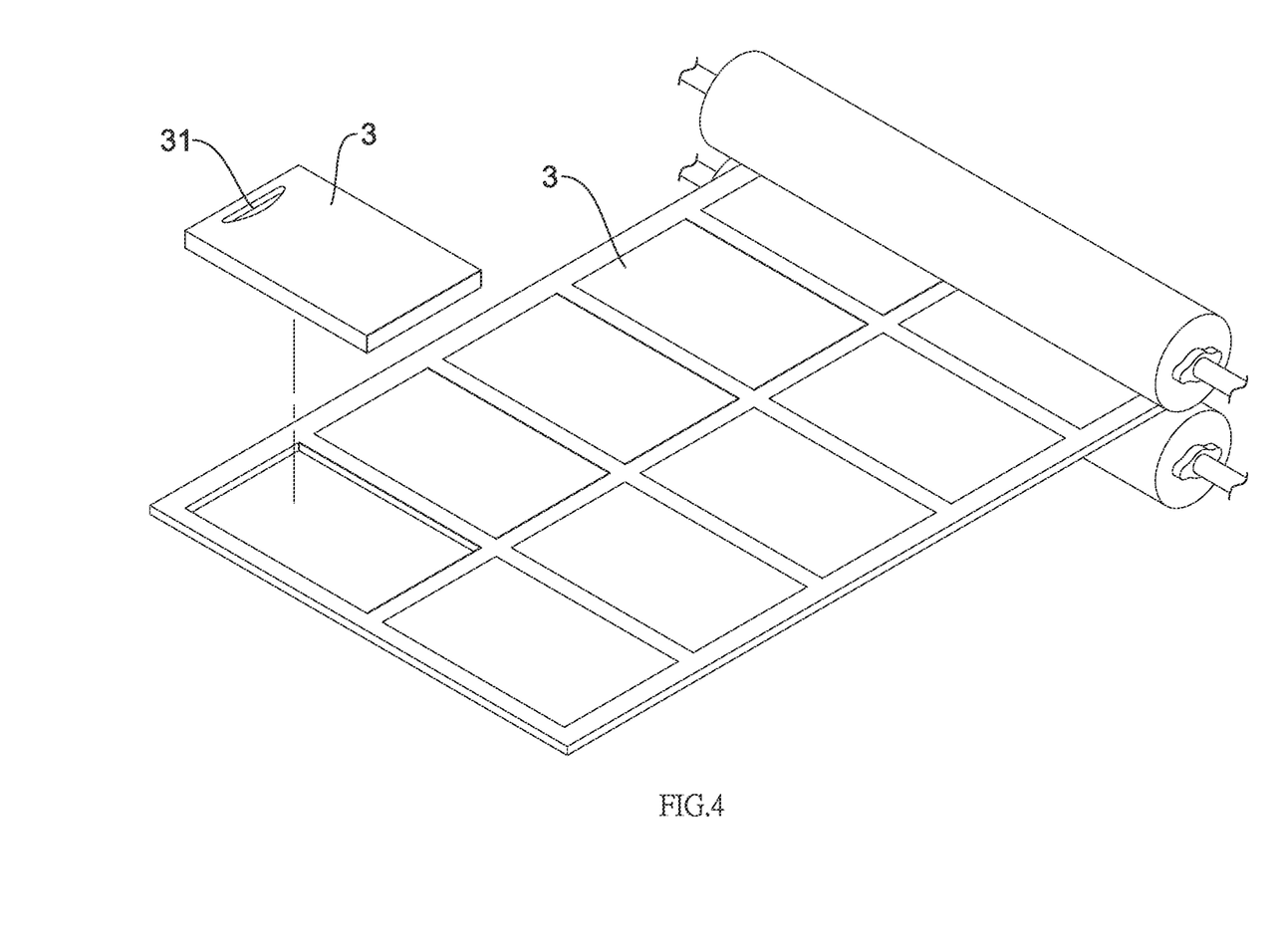
FIG. 4 is a perspective view showing at least one reinforcement layer of the anti-slip and safe chopping board structure having the composite sandwich being manufactured according to the preferred embodiment of the present invention.
Figure 5:
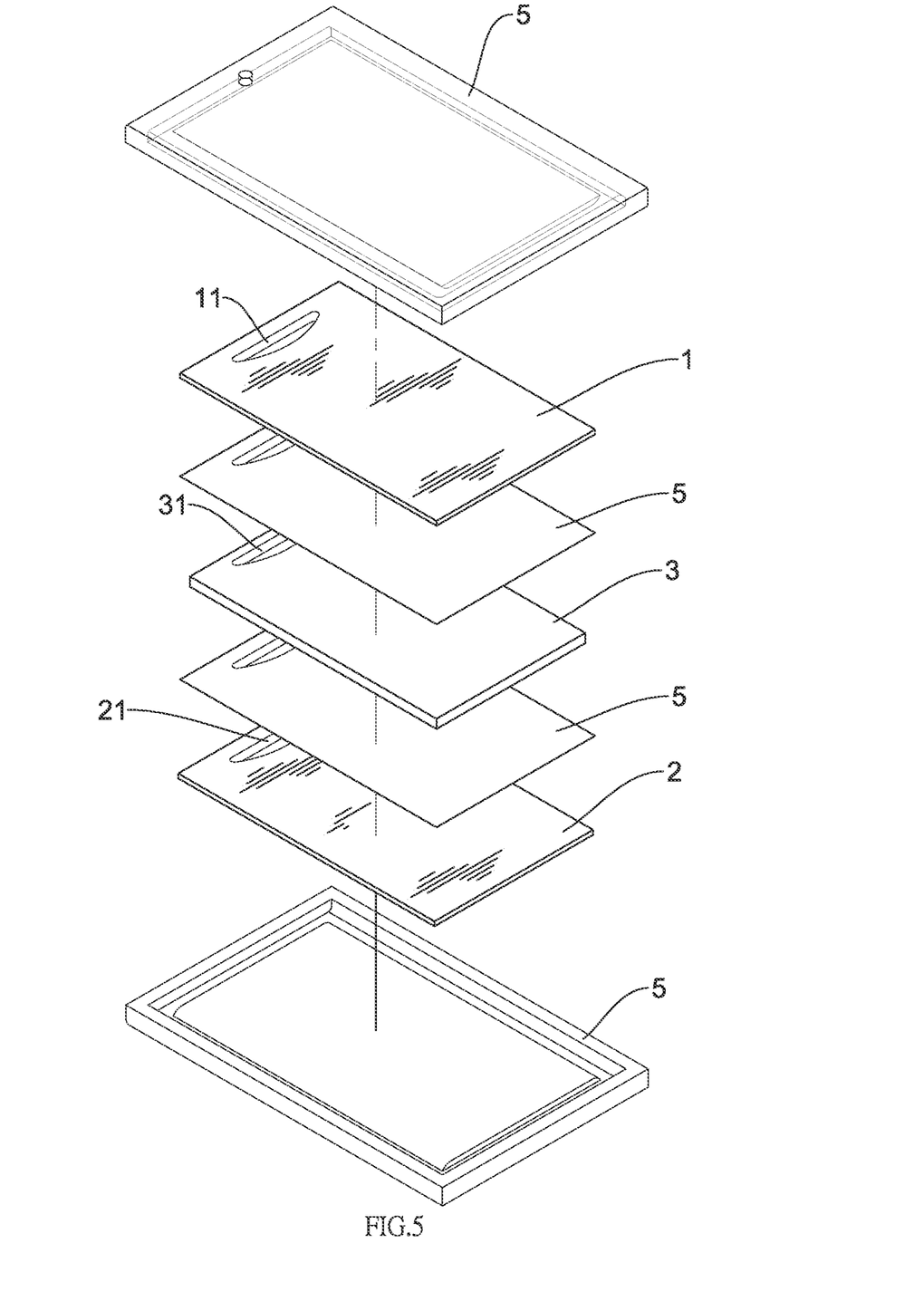
FIG. 5 is a perspective view showing the anti-slip and safe chopping board structure having the composite sandwich being manufactured according to the preferred embodiment of the present invention.
Figure 6:
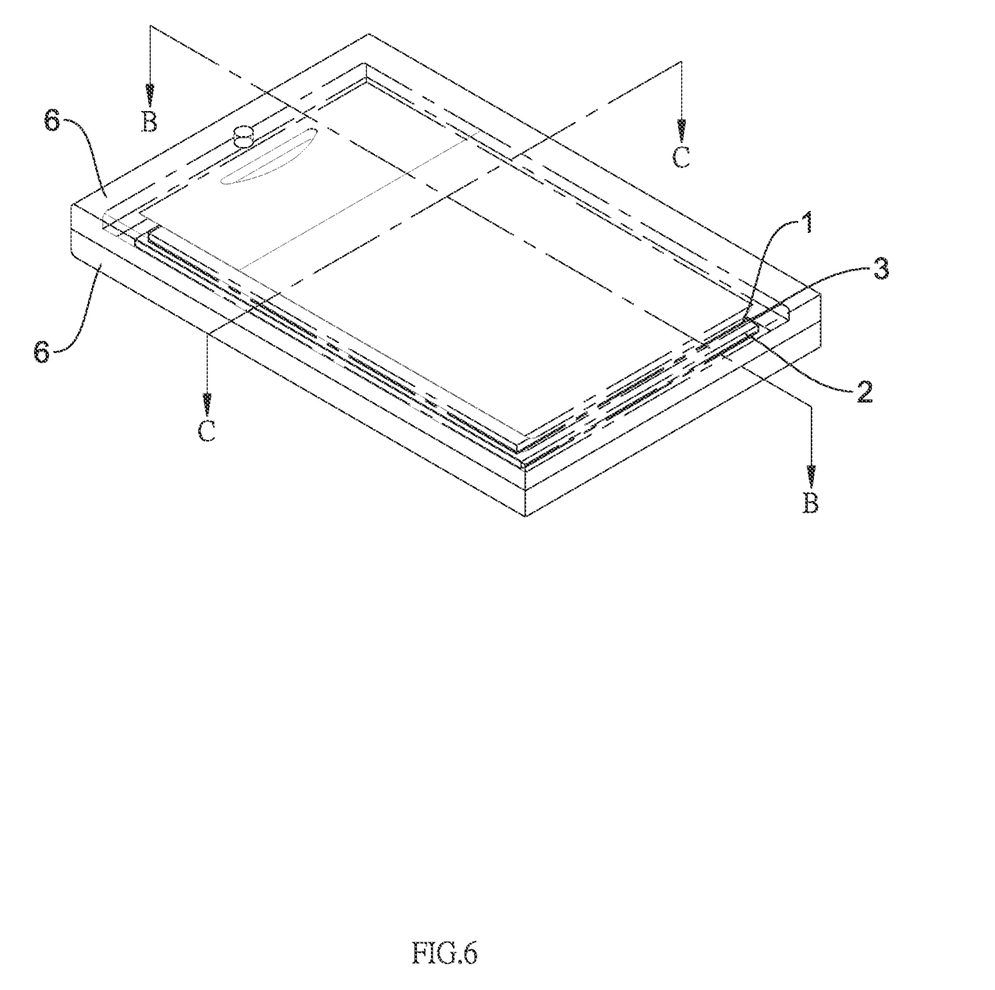
FIG. 6 is a perspective view of a mold configured to manufacture the anti-slip and safe chopping board structure having the composite sandwich according to the preferred embodiment of the present invention.

FIG. 4 is a perspective view showing at least one reinforcement layer of the anti-slip and safe chopping board structure having the composite sandwich being manufactured according to the preferred embodiment of the present invention. As shown in FIG. 5, a respective one reinforcement layer 3 is defined between the respective one top board 1 and a respective one bottom board 2 of at least one bottom board 2 (as illustrated in FIG. 1), wherein the respective one bottom board 2 is made of transparent material or translucent material, a thickness of the respective one reinforcement layer 3 is higher than a thickness of the respective one top board 1 and a thickness of the respective one bottom board 2, and the thickness of the respective one top board 1 and the thickness of the respective one bottom board 2 is half less than the thickness of the respective one reinforcement layer 3. The respective one reinforcement layer 3 is made of recycled plastic material or biodegradable material, and the biodegradable material is wheat straws/corns, such that the respective one reinforcement layer 3 increases a thickness of the anti-slip and safe chopping board structure to enhance stability when chopping ingredients. Since the respective one reinforcement layer 3 is made of the recycled plastic material or the biodegradable material, a consumption of plastic material is reduced to obtain environmental friendly. With reference to FIGS. 5-9, the respective one reinforcement layer 3 includes a second gripping orifice 31 defined thereon. An area of the respective one reinforcement layer 3 is less than an area of the respective one top board 1 and an area of the respective one bottom board 2, such that anti-slip materials are fed into the anti-slip and safe chopping board structure to connect the respective one reinforcement layer 3, the respective one top board 1, and the respective one bottom board 2 tightly and securely.

Figure 10:
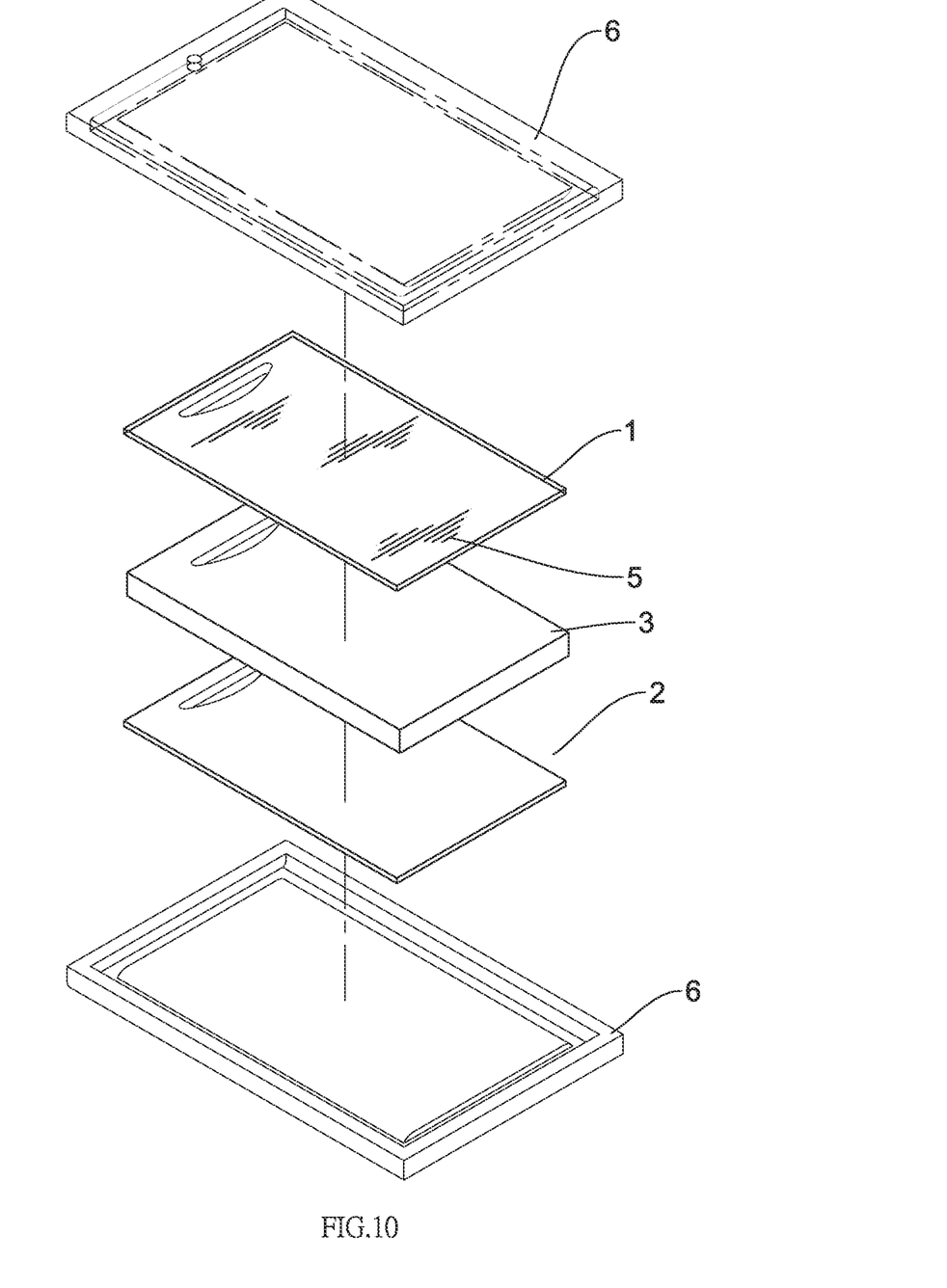
FIG. 10 is a perspective view showing an anti-slip and safe chopping board structure having a composite sandwich being manufactured according to another preferred embodiment of the present invention.
Figure 11:
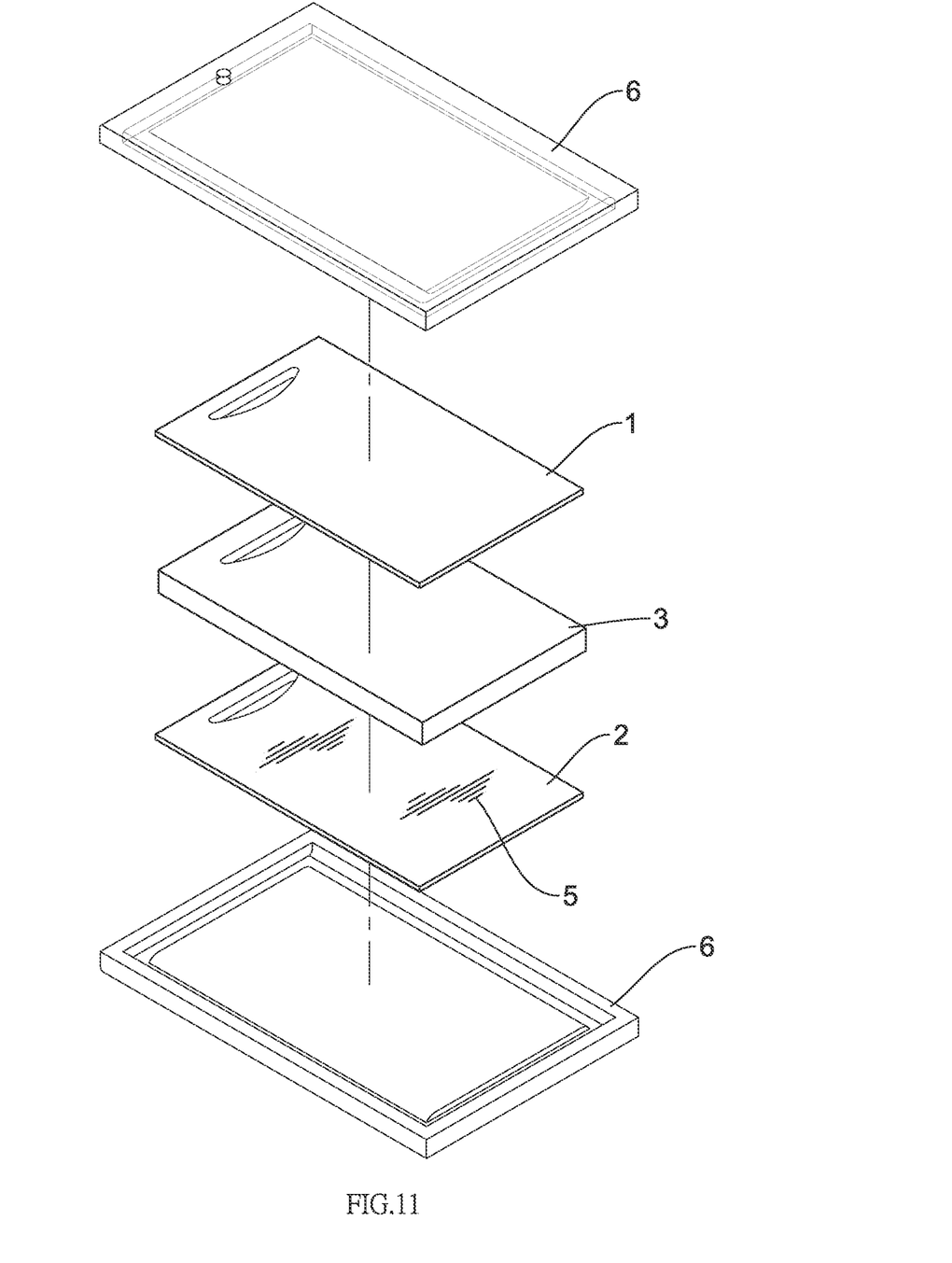
FIG. 11 is a perspective view showing an anti-slip and safe chopping board structure having a composite sandwich being manufactured according to another preferred embodiment of the present invention.

Referring to FIG. 5, a respective one pattern layer 5 of at least one pattern layer 5 is defined between the respective one top board 1 and the respective one bottom board 2, wherein the respective one pattern layer 5 is made of any one of a paper, a fabric, and a film, and the respective one pattern layer 5 includes a pattern formed thereon in an ink printing manner. As illustrated in FIGS. 10 and 11, the respective one pattern layer 5 is printed on a bottom of the respective one top board 1 or a top of the respective one bottom board 2 directly so as to eliminate a printing medium and to save a printing cost of the respective one pattern layer 5. With reference to FIGS. 5-9, the respective one top board 1, the respective one pattern layer 5, the respective one reinforcement layer 3, the respective one pattern layer 5, and the respective one bottom board 2 are placed into a mold 6 in turns, and an anti-slip fringe 4 is injection molded around peripheral sides of the respective one top board 1, the respective one bottom board 2, and the respective one reinforcement layer 3, wherein the anti-slip fringe 4 is made of flexible plastic material so as to absorb vibration and to achieve anti-slip effect.

Figure 7:
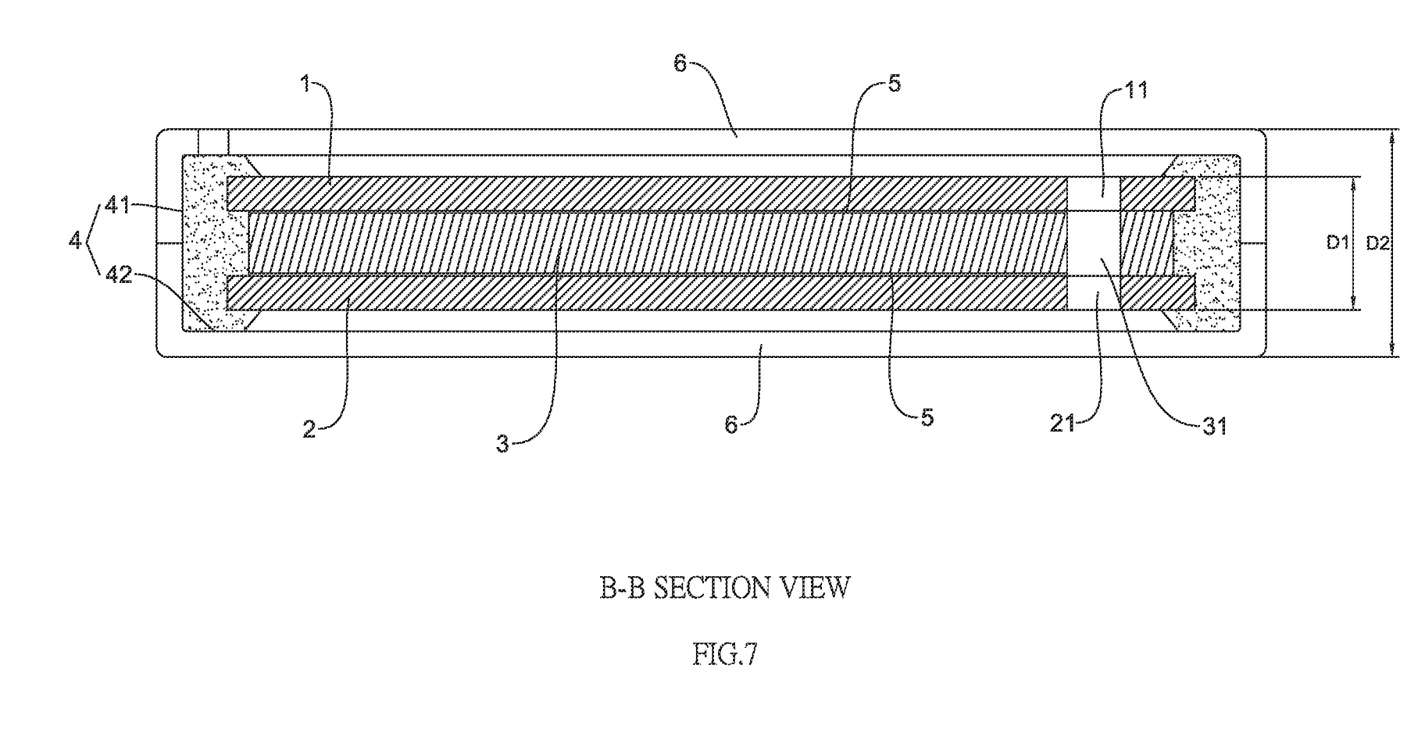
FIG. 7 is a cross sectional view taken along the line B-B of FIG. 6.
Figure 8:
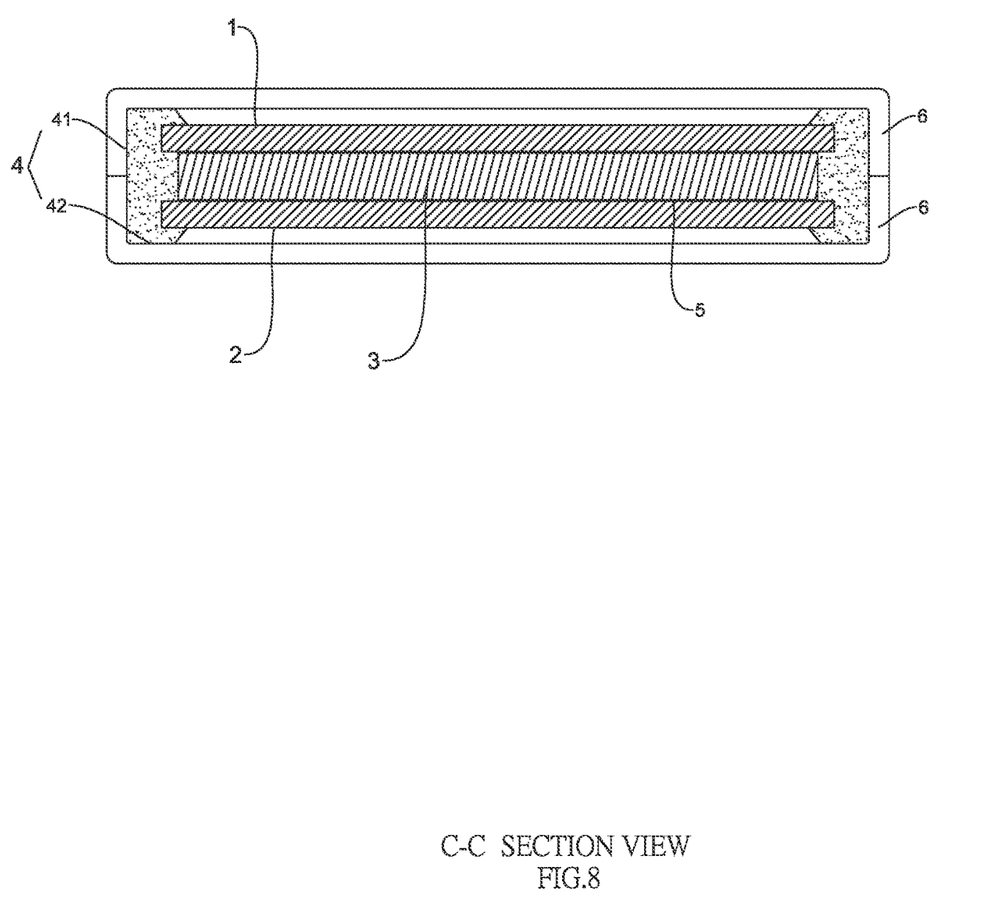
FIG. 8 is a cross sectional view taken along the line C-C of FIG. 6.
Figure 9:
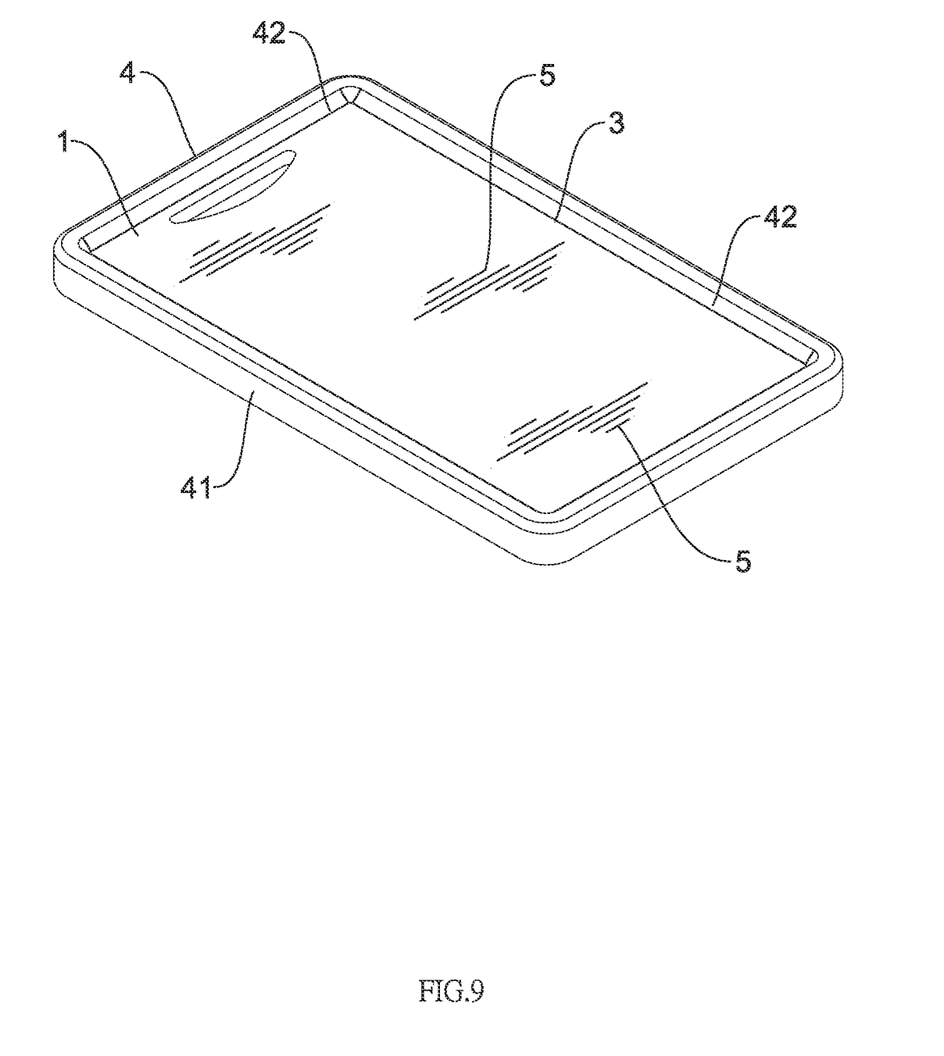
FIG. 9 is a perspective view showing the assembly of the anti-slip and safe chopping board structure having the composite sandwich being manufactured according to the preferred embodiment of the present invention.
Figure 12:
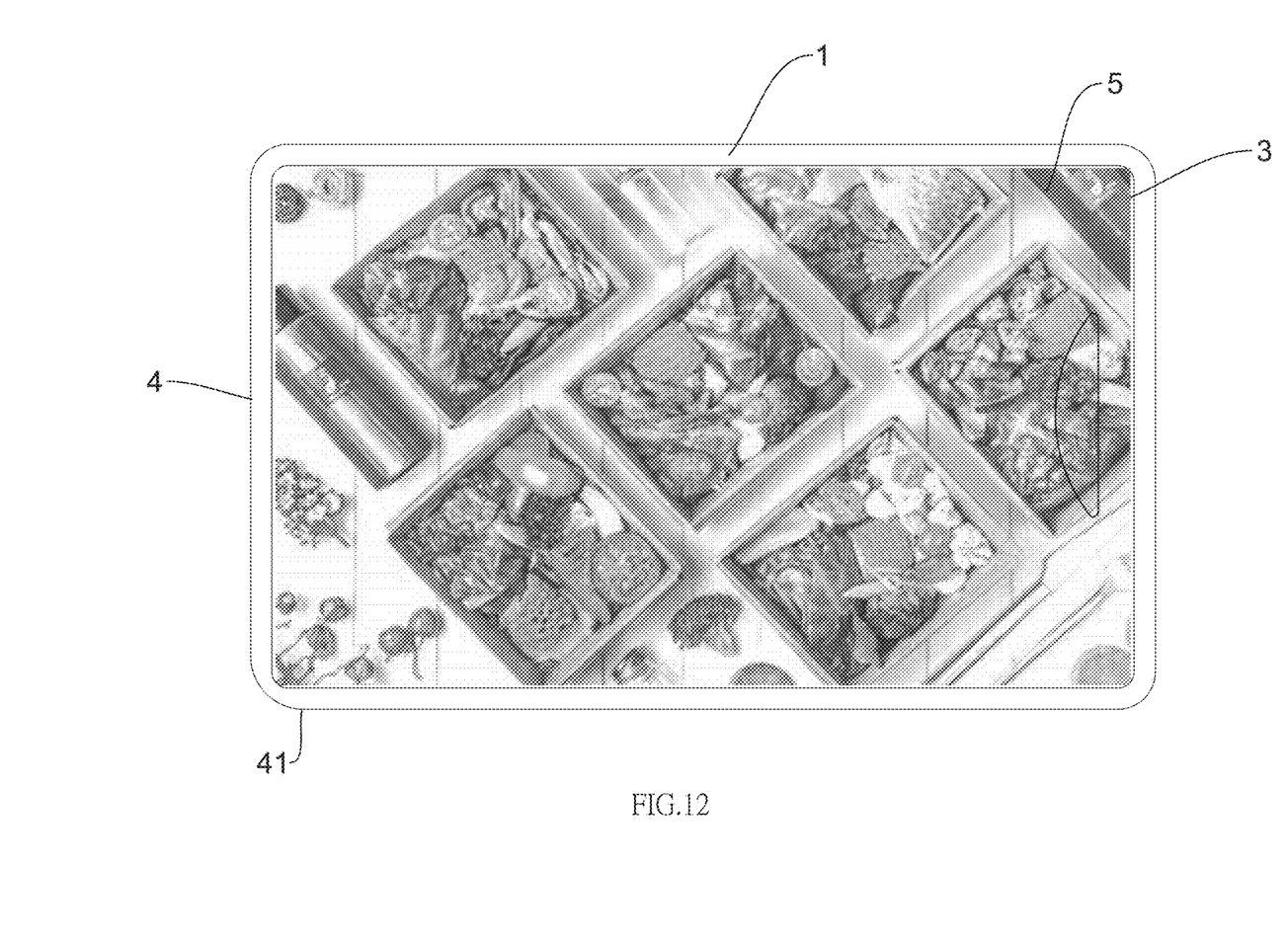
FIG. 12 is a side plan view showing the application of the anti-slip and safe chopping board structure having the composite sandwich being manufactured according to the present invention.

With reference to FIGS. 7-9, the respective one anti-slip fringe 4 includes an extension 41 extending along the peripheral sides of the respective one top board 1 and the respective one bottom board 2 and the respective one reinforcement layer 3, and the respective one anti-slip fringe 4 includes a covering portion 42 extending and covering the respective one top board 1, the respective one bottom board 2, and the respective one reinforcement layer 3 from the extension 41, wherein a highness D1 of the extension 41 of the respective one anti-slip fringe 4 is higher than a highness D2 of the respective one top board 1 and the respective one bottom board 2, such that a top and a bottom of the anti-slip and safe chopping board structure are covered by the respective one anti-slip fringe 4 to form in an inward concavity shape. Referring further to FIG. 12, the first gripping orifice 11 of the respective one top board 1, a third gripping orifice 21 of the respective one bottom board 2, and the second gripping orifice 31 of the respective one reinforcement layer 3 correspond to one another and are integrally injection molded.

In another embodiment, as shown in FIGS. 10 and 11, the respective one pattern layer 5 is printed on a bottom of the respective one top board 1 or a top of the respective one bottom board 2. Also, the respective pattern layer 5 of this embodiment is made as shown in FIGS. 5-8 as well.

Thereby, the anti-slip and safe chopping board structure of the present invention has advantages as follows:

1) The respective one reinforcement layer 3 is made of the recycled plastic material or/and the biodegradable material, and the covering portion 42 covers the respective one top board 1, the respective one bottom board 2 and the respective one reinforcement layer 3 from the extension 41 to avoid a connection gap among the respective one top board 1, the respective one bottom board 2, the respective one reinforcement layer 3, and the respective one anti-slip fringe 4 to obtain a predetermined thickness of the anti-slip and safe chopping board structure, thus chopping the ingredients smoothly and safely and reducing the consumption of the plastic material.

2) The covering portion 42 of the respective one anti-slip fringe 4 covers the respective one top board 1, the respective one bottom board 2 and the respective one reinforcement layer 3 so that water does not flow into the connection gap among the respective one top board 1, the respective one bottom board 2 and the respective one reinforcement layer 3 to avoid releasing inks of the respective one pattern layer 5, thus enhancing an edible safety of the ingredients.

3) The water of the ingredients is stopped by the respective one anti-slip fringe 4 to maintain cleaning when chopping the ingredients.

4) A peripheral side of the anti-slip and safe chopping board structure which is not used, is raised highly to avoid contamination and to buffer vibration.

5) The anti-slip fringe 4 is made of the flexible plastic material so as to absorb the vibration and to achieve the anti-slip effect.

6) The respective one pattern layer 5 is viewable through the respective one top board 1 or the respective one bottom board 2 which is made of the transparent material or the translucent material so as to achieve decoration effect or to remind using notices, such as separating raw ingredients from cooked ingredients when using the anti-slip and safe chopping board structure.

7) When the respective one top board 1 or the respective one bottom board 2 is made of the translucent material, a color of the respective one top board 1 is different from a color of the respective one bottom board 2, thus reminding the using notices, such as separating the raw ingredients from the cooked ingredients.

8) The anti-slip and safe chopping board structure of the present invention is not made of any woods to reduce a size and a weight, thus increasing shipping efficiency and decreasing shipping cost.

While the preferred embodiments of the invention have been set forth for purpose of disclosure, modifications of the disclosed embodiments of the invention and other embodiments thereof may occur to those skilled in the art. Accordingly, the appended claims are intended to cover all embodiments which do not depart from the spirit and scope of the invention.

What is claimed is:

1. An anti-slip and safe chopping board structure comprising: at least one top board, at least one bottom board, at least one reinforcement layer, and at least one anti-slip fringe, a respective one anti-slip fringe of the at least one anti-slip fringe surrounding a respective one top board of the at least one top board, a respective one bottom board of the at least one bottom board, and a respective one reinforcement layer of the at least one reinforcement layer;

wherein the respective one reinforcement layer is defined between the respective one top board and the respective one bottom board, and the respective one top board, the respective one bottom board, and the respective one reinforcement layer are placed in a mold, wherein the respective one anti-slip fringe is injection molded around peripheral sides of the respective one top board, the respective one bottom board, and the respective one reinforcement layer, wherein the respective one anti-slip fringe includes an extension along the peripheral sides of the respective one top board and the respective one bottom board and the respective one reinforcement layer, and the respective one anti-slip fringe includes a covering portion extending and covering the respective one top board, the respective one bottom board, and the respective one reinforcement layer from the extension, wherein a highness of the extension of the respective one anti-slip fringe is higher than a highness of the respective one top board and the respective one bottom board, such that a top and a bottom of the anti-slip and safe chopping board structure are covered by the respective one anti-slip fringe to form in an inward concavity shape.

2. The anti-slip and safe chopping board structure as claimed in claim 1, wherein a respective one pattern layer of at least one pattern layer is defined between the respective one top board and the respective one reinforcement layer and is defined between the respective one bottom board and the respective reinforcement layer.

3. The anti-slip and safe chopping board structure as claimed in claim 2, wherein the respective one pattern layer is printed on a bottom of the respective one top board or a top of the respective one bottom board.

4. The anti-slip and safe chopping board structure as claimed in claim 1, wherein the respective one top board and the respective one bottom board is made of transparent material or translucent material.

5. The anti-slip and safe chopping board structure as claimed in claim 1, wherein the respective one reinforcement layer is made of recycled plastic material or biodegradable material.

6. The anti-slip and safe chopping board structure as claimed in claim 1, wherein the respective one top board includes a first gripping orifice defined thereon, the respective one bottom board includes a second gripping orifice defined thereon, and the respective one reinforcement layer includes a third gripping orifice defined thereon, such that the first gripping orifice, the second gripping orifice, and the third gripping orifice are integrally injection molded.

\* \* \* \* \*